(12) United States Patent
Meyer et al.

(10) Patent No.: US 8,491,434 B2
(45) Date of Patent: Jul. 23, 2013

(54) TRANSMISSION ASSEMBLY HAVING VARIABLE FORCE CLUTCH

(75) Inventors: Kevin G. Meyer, Germantown Hills, IL (US); David J. Schuh, Peoria, IL (US); Timothy A. Lorentz, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 299 days.

(21) Appl. No.: 12/965,624

(22) Filed: Dec. 10, 2010

(65) Prior Publication Data
US 2012/0149519 A1    Jun. 14, 2012

(51) Int. Cl.
*F16H 31/00* (2006.01)

(52) U.S. Cl.
USPC ............ 475/116; 192/85.32; 192/85.38

(58) Field of Classification Search
USPC ............ 192/85.32, 85.38; 475/116, 269, 475/271, 275, 276, 296, 311, 330
See application file for complete search history.

(56) References Cited

U.S. PATENT DOCUMENTS

| | | | |
|---|---|---|---|
| 3,830,082 A | 8/1974 | Clauss, Jr. et al. | |
| 4,238,020 A | 12/1980 | Nerstad et al. | |
| 4,458,797 A | 7/1984 | Hawkins | |
| 4,562,902 A * | 1/1986 | Scibbe | 188/72.4 |
| 4,664,242 A * | 5/1987 | Downs | 192/106 F |
| 5,232,411 A | 8/1993 | Hayashi et al. | |
| 5,439,427 A | 8/1995 | Enokido et al. | |
| 5,511,644 A * | 4/1996 | Murata | 192/85.38 |
| 5,573,092 A | 11/1996 | Gabilondo | |
| 5,701,976 A | 12/1997 | Kumagai et al. | |
| 5,950,787 A * | 9/1999 | Murasugi et al. | 192/85.25 |
| 6,102,825 A | 8/2000 | Hisano et al. | |
| 6,949,042 B2 | 9/2005 | Eymüller et al. | |
| 7,104,380 B2 | 9/2006 | Bishop et al. | |
| 7,140,481 B2 | 11/2006 | Hagenow | |
| 2005/0130787 A1* | 6/2005 | Usoro et al. | 475/275 |
| 2005/0217962 A1 | 10/2005 | Pedersen et al. | |
| 2007/0042858 A1* | 2/2007 | Raghavan et al. | 475/276 |
| 2009/0023536 A1* | 1/2009 | Wittkopp et al. | 475/275 |
| 2009/0023539 A1* | 1/2009 | Wittkopp et al. | 475/275 |
| 2010/0210402 A1* | 8/2010 | Phillips et al. | 475/275 |

FOREIGN PATENT DOCUMENTS

| | | |
|---|---|---|
| DE | 10256023 | 6/2004 |
| EP | 1635082 | 3/2006 |
| EP | 2063146 | 5/2009 |
| GB | 1287393 | 8/1972 |

\* cited by examiner

*Primary Examiner* — Justin Holmes
(74) *Attorney, Agent, or Firm* — Finnegan, Henderson, Farabow, Garrett & Dunner LLP

(57) ABSTRACT

A transmission assembly for a machine is disclosed. The transmission assembly may have a clutch pack, a first pressure chamber, and a second pressure chamber. The transmission assembly may also have a first piston configured to push against the clutch pack when pressurized fluid is directed into the first pressure chamber, and a second piston configured to push against the first piston when pressurized fluid is directed into the first pressure chamber and inhibited from pushing against the first piston when pressurized fluid is directed into the second pressure chamber.

19 Claims, 6 Drawing Sheets

CLUTCH COMBINATION

82

| | 1F | 2F | 3F | 4F | 5F | 6F | 7F | 8F | 9F | 1R | 2R |
|---|---|---|---|---|---|---|---|---|---|---|---|
| CLUTCH 70 | X | | | X | | | | | | X | X |
| CLUTCH 72 | | X | | | X | | X | X | | X | X |
| CLUTCH 74 | X | X | X | | X | X | X | X | X | | |
| CLUTCH 76 | | | X | | | X | X | X | | | |
| CLUTCH 78 | X | X | X | | | | | | | X | |
| CLUTCH 80 | | | | X | X | X | X | | | | X |

TORQUE

| | 1F | 2F | 3F | 4F | 5F | 6F | 7F | 8F | 9F | 1R | 2R |
|---|---|---|---|---|---|---|---|---|---|---|---|
| CLUTCH 70 | 0.31 | 0.00 | 0.00 | 0.31 | 0.00 | 0.00 | 0.00 | 0.00 | -0.31 | -2.29 | -2.29 |
| CLUTCH 72 | 0.00 | 0.24 | 0.00 | 0.00 | 0.24 | 0.00 | -0.31 | -0.44 | 0.00 | 1.98 | 1.98 |
| CLUTCH 74 | 2.02 | 1.78 | 1.00 | 2.02 | 1.78 | 1.00 | 0.00 | -0.44 | 0.00 | 0.00 | 0.00 |
| CLUTCH 76 | 0.00 | 0.00 | -0.35 | 0.00 | 0.00 | -0.35 | -0.80 | -1.00 | -0.69 | 0.00 | 0.00 |
| CLUTCH 78 | 4.92 | 3.75 | 2.44 | 1.36 | 1.03 | 0.67 | 0.21 | 0.00 | 0.00 | -4.83 | 0.00 |
| CLUTCH 80 | 0.00 | 0.00 | 0.00 | 0.00 | 0.00 | 0.00 | 0.00 | 0.00 | 0.00 | 0.00 | -1.33 |

TRANSMISSION ASSEMBLY HAVING VARIABLE FORCE CLUTCH

TECHNICAL FIELD

The present disclosure relates generally to a transmission assembly, and more particularly, to a transmission assembly having a variable force clutch.

BACKGROUND

Machines such as articulated haul trucks and off-highway mining trucks include an engine that provides power to wheels of the trucks via a planetary-type transmission. A planetary-type transmission is generally made up of at least three different elements, including a sun gear, a planet carrier having at least one set of planet gears, and a ring gear. The planet gears of the planet carrier mesh with the sun gear and the ring gear. One of the sun gear, planet carrier and ring gear is driven as an input to the transmission, while another of the sun gear, planet carrier, and ring gear rotates as an output of the transmission. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or speed-to-torque ratio of the transmission depends upon the number of teeth in the sun and ring gears, the gear(s) that is selected as the input, the gear(s) that is selected as the output, and which gear, if any, is held stationary or rotationally locked with another gear. A hydraulic clutch (also commonly referred to as a brake) is used to hold particular gears stationary and/or to lock the rotation of particular gears together.

The amount of resistive torque required to hold a gear stationary or to lock the rotation of one gear together with another gear can vary. For example, when operating in a low reverse gear, significantly more torque may be required from a particular clutch than required from the same clutch during operation in a forward high gear. When the clutch is capable of providing only a single level of torque (i.e., the highest level required during any operation), shifting of the transmission between reverse and forward gears when only a small amount of resistive torque is required can be too rapid resulting in rough operation that is uncomfortable for an operator of the machine and possibly damaging to the machine.

One attempt to improve shift quality is described in U.S. Pat. No. 7,140,481 (the '481 patent) by Hagenow that issued on Nov. 28, 2010. Specifically, the '481 patent discloses a clutch piston amplifier assembly provided for applying different levels of pressure to a clutch pack to engage a first member and a second member of an automatic transmission. The clutch amplifier assembly includes a piston chamber, and a stage separator plate provided in the piston chamber to divide the piston chamber into a first chamber portion and a second chamber portion. The clutch amplifier assembly also includes an apply piston provided in the first chamber portion and having an axially extending arm which engages the clutch pack for applying axial pressure thereto, and an amplifier piston provided in the second chamber portion. Amplifier drive pins are provided between and engaged with both the apply piston and the amplifier piston, and a return spring is located between the apply piston and a wall of the piston chamber. During operation, pressurized fluid is directed into the first chamber portion to move the apply piston against the spring and generate a first pressure on the clutch pack (i.e., a first resistive torque on the first and second members). Pressurized fluid can also or alternatively be directed into the second chamber portion to move the amplifier piston against the drive pin, which pushes on the apply piston to increase the pressure or provide a different level of pressure on the clutch pack. In this manner, three levels of pressure (apply piston pressure, amplifier piston pressure, or apply piston pressure+ amplifier piston pressure) are available, thereby allowing for tunability of the pressure and a resulting smoother shift operation.

Although the assembly of the '481 patent may improve shift quality, it may be complicated and difficult to control. Specifically, different valving for each of the first and second chamber portions may be required to appropriately control the flows of pressurized fluid. In addition, regulation of the different valving may require precise timing and complex control. Further, use of the amplifier drive pins may increase a cost of the system, provide a potential leak path for pressurized fluid, and reduce a durability of the system.

The disclosed transmission assembly is directed to overcoming one or more of the problems set forth above and/or other problems of the prior art.

SUMMARY

In one aspect, the present disclosure is directed to a transmission assembly. The transmission assembly may include a clutch pack, a first pressure chamber, and a second pressure chamber. The transmission assembly may also include a first piston configured to push against the clutch pack when pressurized fluid is directed into the first pressure chamber, and a second piston configured to push against the first piston when pressurized fluid is directed into the first pressure chamber and inhibited from pushing against the first piston when pressurized fluid is directed into the second pressure chamber.

In another aspect, the present disclosure is directed to a method of operating a transmission. The method may include pressurizing a first chamber to generate a first resistive torque on a rotating member during a transmission operation in a first direction. The method may also include pressurizing the first chamber and a second chamber to generate a second resistive torque less than the first resistive torque during a transmission operation in a second direction.

BRIEF DESCRIPTION OF THE DRAWINGS

FIG. 5 is a truth table depicting exemplary disclosed gear combinations of the transmission assembly of FIG. 2;

DETAILED DESCRIPTION

Figure 1:
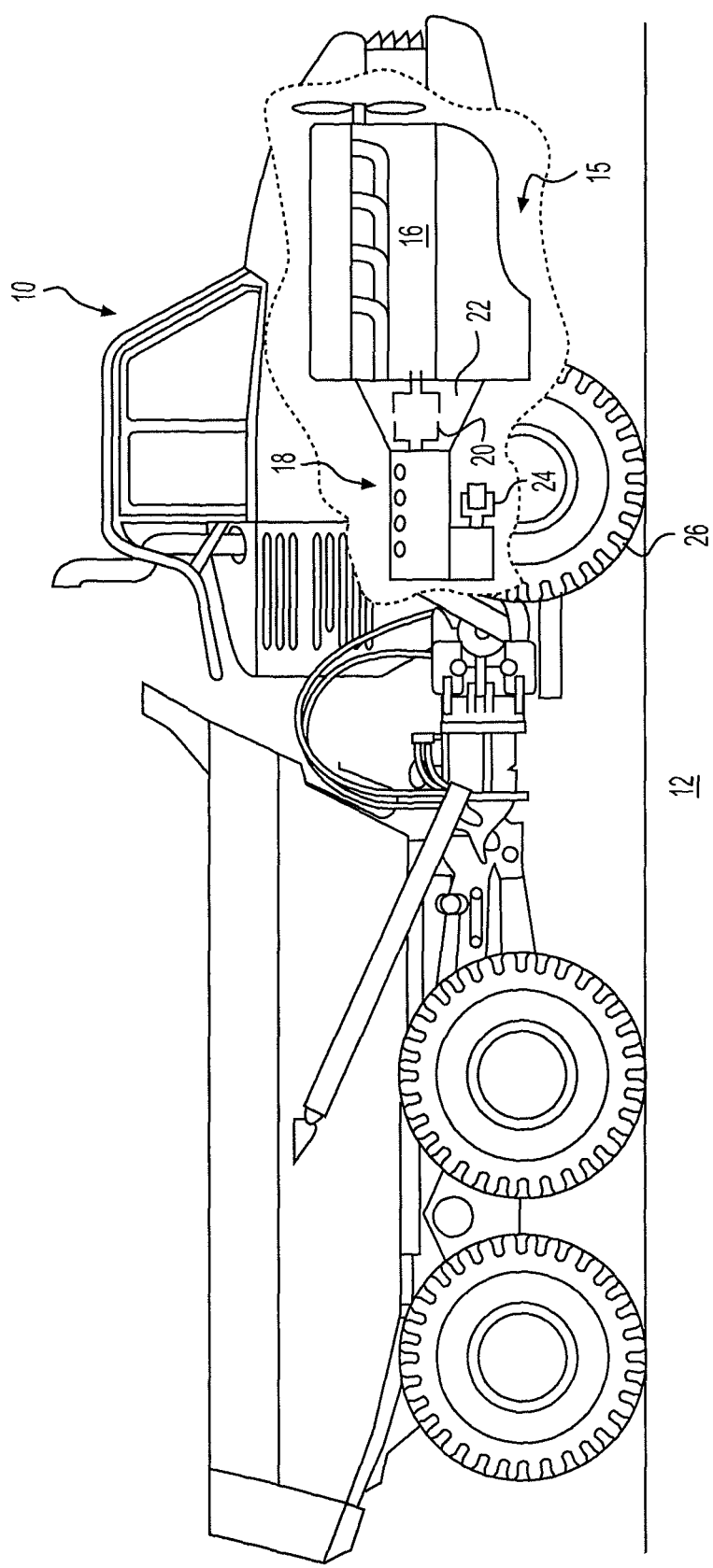
FIG. 1 is a diagrammatic illustration of an exemplary disclosed machine.

FIG. 1 illustrates an exemplary mobile machine 10 that may perform a predetermined task at a worksite 12. In the depicted embodiment, machine 10 is an articulated haul truck. It is contemplated, however, that machine 10 may embody another type of mobile machine such as an off-highway mining truck, a wheel loader, a motor grader, or any other mobile machine known in the art. Worksite 12 may include, for example, a mine site, a landfill, a quarry, a construction site, or another type of worksite. The predetermined task performed by machine 10 may require machine 10 to generally traverse worksite 12 between different destinations. Accordingly, machine 10 may be provided with a power train 15 that facilitates travel between the different destinations at worksite 12.

Power train 15 may generally include an engine 16 and a transmission assembly 18. Engine 16 may embody any type of engine known in the art, for example, a diesel, gasoline, or gaseous-fuel powered, internal combustion engine configured to generate a mechanical power output. Transmission assembly 18 may include an input member 20 connecting transmission assembly 18 to the mechanical power output of engine 16 via a torque converter 22, and an output member 24 connecting transmission assembly 18 to one or more traction devices 26. As will be described in more detail below, transmission assembly 18 may embody a mechanical step-change transmission having at least one reverse gear ratio and a plurality of forward gear ratios. Each of the different gear ratios may be manually or automatically selected to provide a different ratio of speed-to-torque in either the forward or reverse travel directions.

Figure 2:
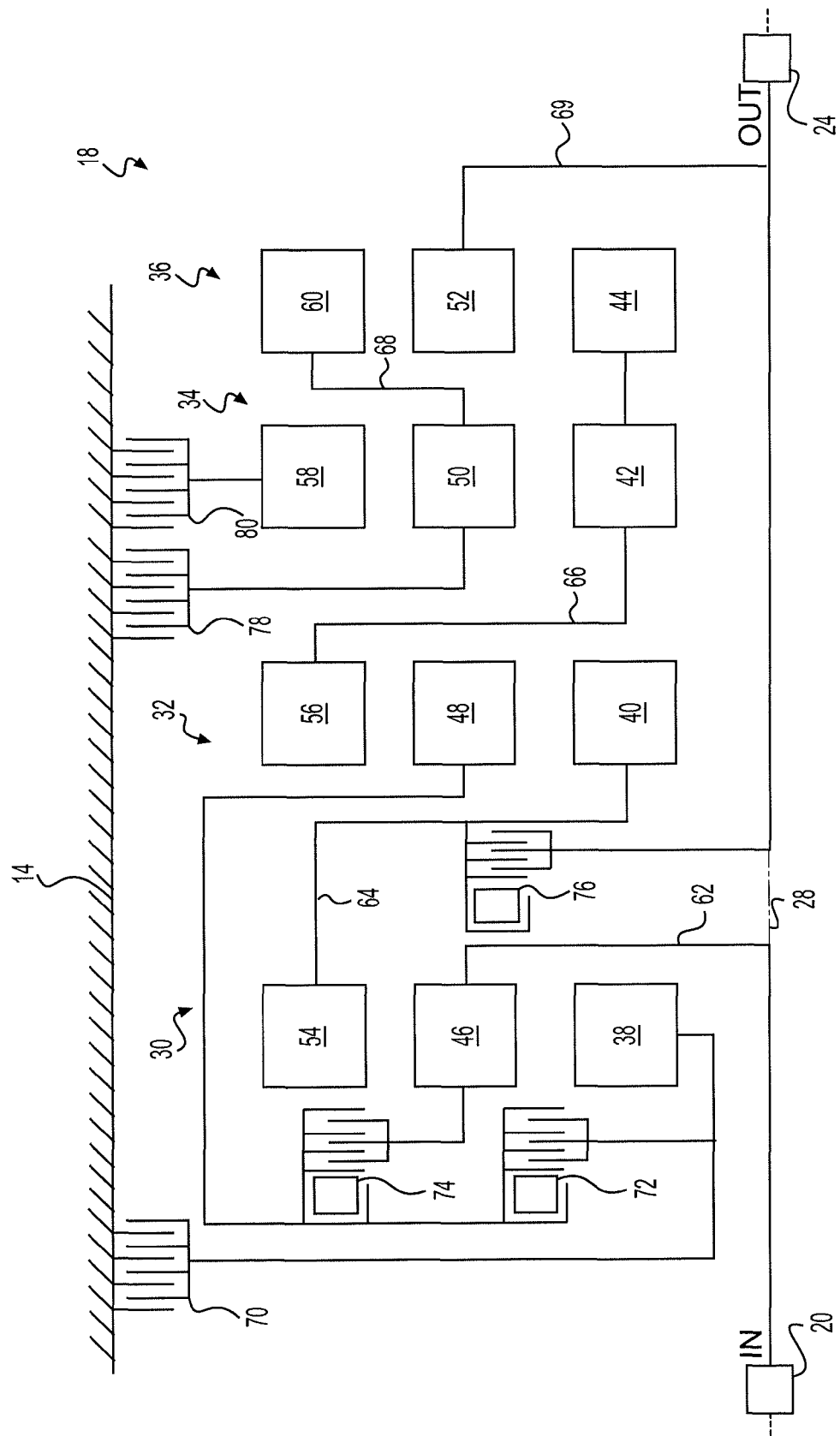
FIG. 2 is a schematic illustration of an exemplary disclosed transmission assembly that may be used with the machine of FIG. 1.

FIG. 2 schematically illustrates one half of transmission assembly 18 located to the side of a rotational axis of symmetry (axis) 28. Input member 20 and output member 24 may be aligned along axis 28. Transmission assembly 18 may generally include a stationary housing 14, and four different planetary gear assembly 30, 32, 34, and 36 disposed within housing 14 and rotatably supported and aligned along axis 28. It is contemplated that transmission assembly 18 could include a greater or lesser number of planetary gear assemblies, as desired. The structure of the different gears, input members, output members, and connections therebetween can be achieved using conventional components.

In the disclosed embodiment, each of planetary gear assemblies 30-36 may include multiple interconnected components. Specifically, each of planetary gear assemblies 30-36 may include a sun gear 38-44, a planet carrier 46-52, and a ring gear 54-60, respectively. Planet carrier 46 of planetary gear assembly 30 may be fixed to rotate with input member 20 via a coupling 62, while ring gear 54, also of planetary gear assembly 30, may be fixed to rotate with sun gear 40 of planetary gear assembly 32 via a coupling 64. Ring gear 56 of planetary gear assembly 32 may be fixed to rotate with sun gears 42 and 44 of planetary gear assemblies 34 and 36 via a coupling 66. Planet carrier 50 of planetary gear assembly 34 may be fixed to rotate with ring gear 60 of planetary gear assembly 36 via a coupling 68. Finally, planet carrier 52 of planetary gear assembly 36 may be fixed to rotate with output member 24 via a coupling 69.

Transmission assembly 18 may also include a plurality of clutches selectively actuated to exert torque on portions of couplings 62-69, sun gears 38-44, planet carriers 46-52, and/or ring gears 54-60 that resist relative rotations between components and thereby rotationally lock the components to each other and/or to housing 14 in a variety of different configurations. These connections may facilitate a modification of the speed-to-torque ratio and/or the rotational direction received at input member 20 relative to the speed-to-torque ratio and rotational direction delivered to output member 24. In the disclosed embodiment, transmission assembly 18 includes six different clutches 70, 72, 74, 76, 78, and 80. It is contemplated, however, that transmission assembly 18 could include a greater or lesser number of clutches, as desired. Clutch 70 may be configured to selectively connect sun gear 38 to housing 14. Clutch 72 may be configured to selectively connect sun gear 38 to planet carrier 48. Clutch 74 may be configured to selectively connect planet carrier 46 to coupling 62 (i.e., to planet carrier 48 and input member 20). Clutch 76 may be configured to selectively connect coupling 64 (i.e., ring gear 54 and sun gear 40) to coupling 69 (i.e., planet carrier 52 and output member 24). Clutch 78 may be configured to selectively connect coupling 68 (i.e., planet carrier 50 and ring gear 60) to housing 14. Clutch 80 may be configured to selectively connect ring gear 58 to housing 14.

Figure 3:
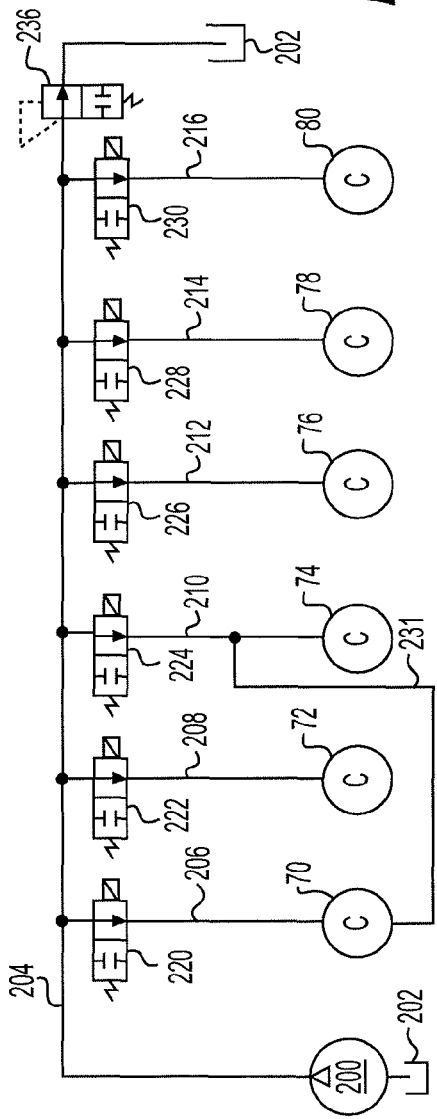
FIG. 3 is a schematic illustration of an exemplary disclosed hydraulic circuit for the transmission assembly of FIG. 2.
Figure 4:
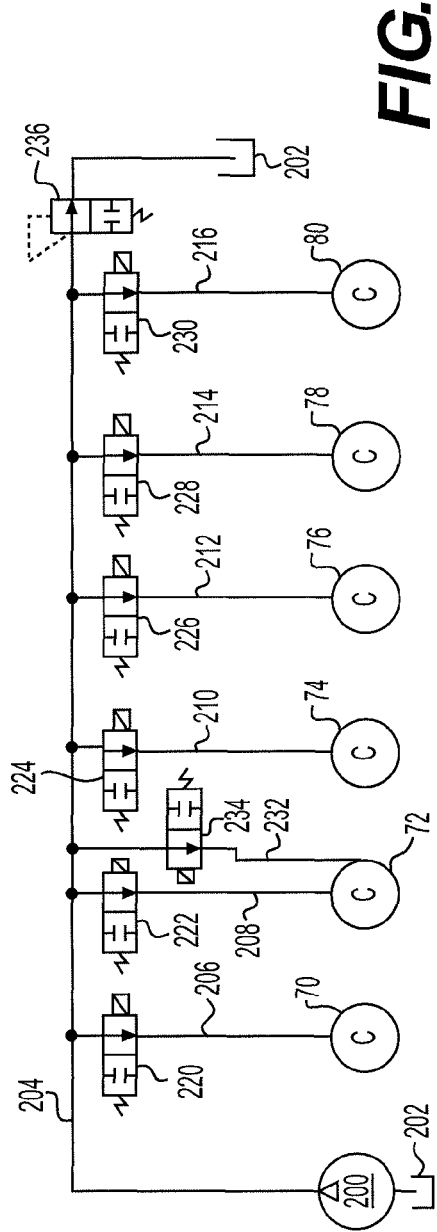
FIG. 4 is another schematic illustration of another exemplary disclosed hydraulic circuit for the transmission assembly of FIG. 2.

As shown in FIGS. 3 and 4, clutches 70-80 may be selectively supplied with hydraulic fluid to engage and connect the corresponding components described above. In particular, transmission assembly 18 may include a pump 200 configured to draw fluid from a low pressure supply 202, pressurize the fluid, and direct the pressurized fluid in parallel to clutches 70-80 by way of a manifold 204 and a plurality of distribution lines 206, 208, 210, 212, 214, and 216, respectively. Each of clutches 70-80, as will be described in more detail below, may include one or more interior actuating chambers that, when filled with the pressurized fluid, displaces one or more pistons moving the piston(s) toward one or more clutch packs. As a piston "touches up" to a clutch pack, the actuating chamber(s) of the clutch is full of fluid and the clutch is engaged to rotationally lock the corresponding components. As will also be described in more detail below, the combination of engaged clutches may determine the output speed-to-torque ratio and the rotational direction of transmission assembly 18.

A plurality of control valves 220, 222, 224, 226, 228, and 230 may be disposed within distribution lines 206-216, respectively, between manifold 204 and clutches 70-80. Control valves 220-230 may be selectively energized, based on operator or automatic transmission controller commands, to regulate flows of pressurized fluid to the interior actuating chambers of clutches 70-80. In one example, each of control valves 220-230 may include a two-position, two-way valve mechanism (not shown) that is solenoid operated to actuate one or more of clutches 70-80. Each of the valve mechanisms may be movable between an open or flow-passing position at which fluid is allowed to flow into an associated actuating chamber, and a closed or flow-blocking position at which fluid flow is blocked from the actuating chamber. It is contemplated that each control valve 220-230 may include additional or different mechanisms, if desired, such as a proportional valve mechanism, a pilot valve mechanism configured to control a pressure of the fluid entering the two-position valve mechanisms and interior actuating chamber of the associated clutch or clutches, or any other mechanisms known in the art.

It is contemplated that a single control valve 220-230 may be associated with more than one of clutches 70-80, and vice versa. For example, FIG. 3 shows control valve 224 as being associated with clutch 70 and with clutch 74. That is, when control valve 224 is moved to the flow-passing position to actuate clutch 74, pressurized fluid from manifold 204 may also be simultaneously directed via control valve 224 and a distribution line 231 into clutch 70. In addition, clutch 70 may be provided with pressurized fluid from manifold 204 via control valve 220 and distribution line 206. Clutch 70, as will be described in more detail below, may include multiple pressure chambers, each of which may receive pressurized fluid via different flow paths.

FIG. 4 illustrates an alternative transmission assembly 18 having a hydraulic circuit arrangement different from that shown in FIG. 3. The embodiment of FIG. 4, like that of FIG. 3, may also include two control valves associated with the same clutch. In the embodiment of FIG. 4, however, clutch 72 may be the clutch with multiple pressure chambers, each having a dedicated distribution line (208 and 232) and a dedicated control valve (222 and 234).

A pressure relief valve 236 may be disposed within manifold 204 downstream of distribution lines 206-216 and configured to selectively pass fluid to low-pressure supply 202 in response to a pressure of the fluid within manifold 204. By way of example, pressure relief valve 236 may include a valve element that is spring biased toward a flow-blocking position and movable toward a flow-passing position in response to a pressure of the fluid within manifold 204. When the pressure within manifold 204 exceeds a predetermined threshold, the force generated by the fluid pressure acting on the valve element may overcome the spring force allowing the valve element to move to the flow-passing position. In this manner, pressure relief valve 236 may function to maintain a desired pressure within manifold 204.

FIG. 5 discloses a truth table 82 describing possible engagement combinations of clutches 70-80, which establish nine forward gear ratios and two reverse gear ratios between input member 20 and output member 24 by way of planetary gear assemblies 30-36. For example, to achieve the first forward gear ratio, clutches 70, 74, and 78 are shown to be simultaneously actuated to engage the corresponding components and exert resistive torques of about 0.31, 1.78, and 3.75 times a torque received at input member 20, respectively, and thereby rotationally lock the corresponding components. In this configuration, sun gear 38 and coupling 68 (including planet carrier 50 and ring gear 60) may be locked to housing 14, and power may be transferred from input member 20 to output member 24 via coupling 62, planet carrier 46, clutch 74, planet carrier 48, ring gear 56, coupling 66, sun gear 44, planet carrier 52, and coupling 69 (referring to FIG. 2). In another example, the first reverse gear ratio is shown to be achieved by simultaneously actuating clutches 70, 72, and 78 to engage the corresponding components and exert resistive torque of about −2.29, 1.98, and −4.83 times the input torque, respectively, and thereby rotationally lock the components. In this configuration, sun gear 38 and coupling 68 (including planet carrier 50 and ring gear 60) may be locked to housing 14, and power may be transferred from input member 20 to output member 24 via coupling 62, planet carrier 46, ring gear 54, coupling 64, sun gear 40, planet carrier 48, ring gear 56, coupling 66, sun gear 44, and planet carrier 52 (referring to FIG. 2).

As can be seen from comparison of the conditions surrounding operation of transmission assembly 18 in the first forward gear ratio and the first reverse gear ratio, the range of resistive torque required by clutch 70 to rotationally lock the corresponding components can be significant. Specifically, when shifting to the first forward gear ratio, clutch 70 may only be required to exert a resistive torque of 0.31 times the input torque to sufficiently lock sun gear 38 to housing 14. However, when shifting to the first reverse gear ratio, clutch 70 may be required to exert a resistive torque of −2.29 times the input torque to sufficiently lock sun gear 38 to housing 14, which is more than six times greater than required during shifting to the first forward gear ratio. If unaccounted for, this extreme range of resistive torque could cause clutch 70 to engage too quickly during shifting to the first forward gear ratio at the lower torque level (with clutch 70 designed to accommodate the much higher resistive torque), resulting in a sudden and jerky shift.

Figure 6:
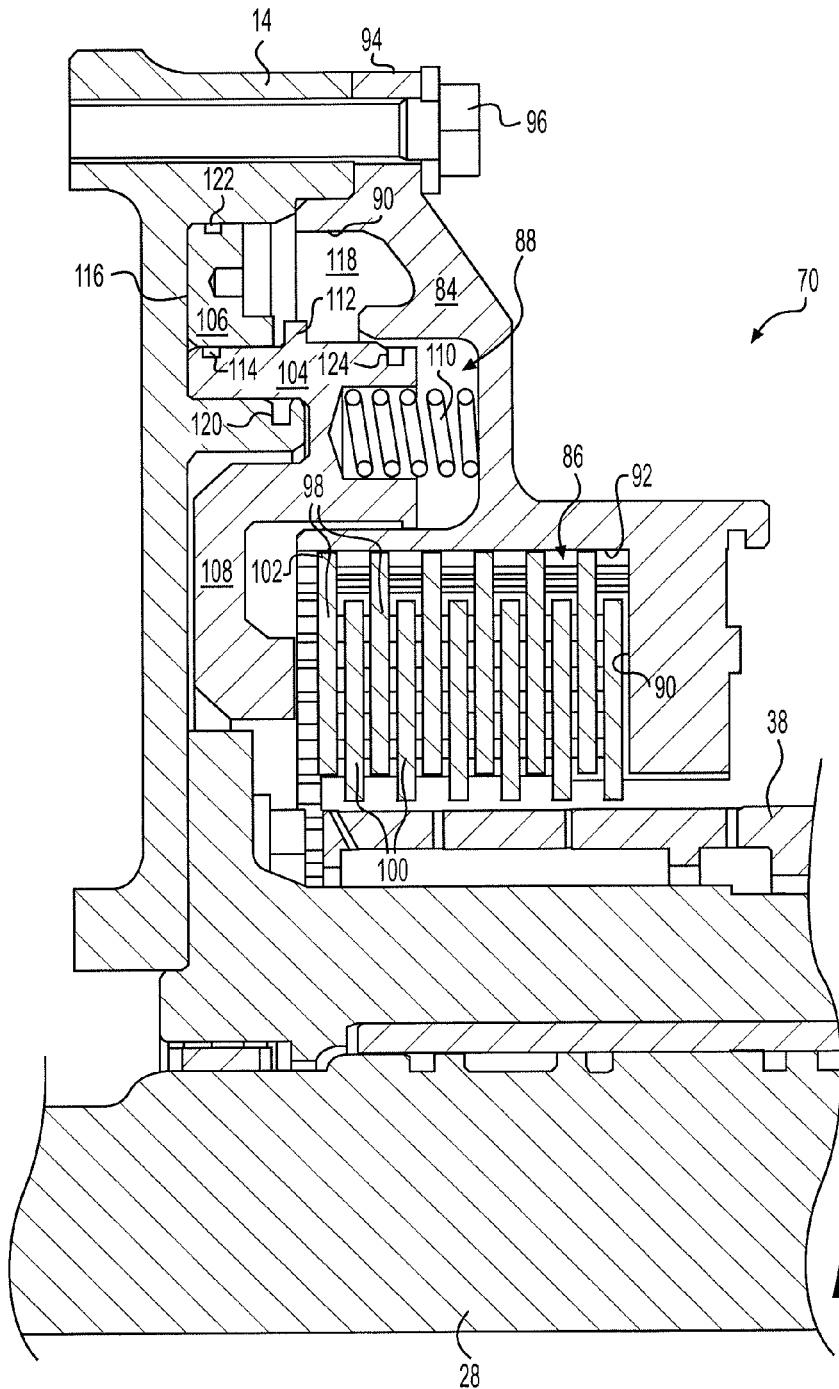
FIG. 6 is a cross-sectional illustration of a portion of the transmission assembly of FIG. 2.

FIG. 6 illustrates an exemplary design of clutch 70 that may help to improve shift quality of transmission assembly 18 by providing varying levels of resistive torque. Clutch 70 may include a clutch housing 84, a clutch pack 86 disposed within clutch housing 84, and a clutch actuator 88 also disposed within clutch housing 84. Clutch actuator 88 may be selectively supplied with pressurized fluid from manifold 204 via control valves 220 and 224 (referring to FIG. 3) to push on clutch pack 86 and thereby engage clutch 70.

Clutch housing 84 may be a generally hollow torroidal-shaped vessel configured to annularly enclose an end of sun gear 38 and thereby define an annular recess 90. Clutch housing 84 may include an internal spline 92 located at annular recess 90 in opposition to external teeth of sun gear 38. Clutch housing 84, at an outer peripheral surface 94, may be configured to engage housing 14 of transmission assembly 18. A fastener 96 may lock clutch housing 84 to housing 14.

Clutch pack 86 may be disposed within recess 90 and include components alternatingly engaged with internal spline 92 and with the external gear teeth of sun gear 38. Specifically, clutch pack 86 may include a first plurality of disks 98, and a second plurality of disks 100 evenly distributed between disks 98. Disks 98 may include an external spline 102 that intermeshes with internal spline 92, while disks 100 may include internal gear teeth that intermesh with the external gear teeth of sun gear 38. Disks 98 and/or disks 100 may have friction material bonded to their surface and, when clutch pack 86 is pushed on by clutch actuator 88, disks 98 and 100 may be pressed together and become rotationally locked. When disks 98 and 100 are locked, sun gear 38 may be locked to housing 14 and thereby inhibited from rotating.

Clutch actuator 88 may be a hydraulic actuator selectively supplied with pressurized fluid to generate an axial force directed to an end of clutch pack 86. In particular, clutch actuator 88 may include a first piston 104 and a second piston 106 disposed within recess 90. Both first and second pistons 104, 106 may be annularly disposed around clutch pack 86, with first piston 104 located radially inward of second piston 106. First piston 104, when viewed in the cross-section of FIG. 6, may include an arm portion 108 that extends radially inward to press on an end of clutch pack 86. A spring 110 may be disposed between an end of first piston 104 and an inner radial surface of clutch housing 84 to bias first piston 104 away from clutch pack 86. A radial protrusion 112, extending from first piston 104 in a direction opposite arm portion 108, may be configured to engage second piston 106 and thereby limit the motion of second piston 106 in the direction of clutch pack 86 (i.e., during motion of second piston 106 toward clutch pack 86, an axial end of second piston 106 may engage and push against protrusion 112). A seal 114 may be disposed between an outer annular surface of first piston 104 and an inner annular surface of second piston 106.

First and second pistons 104, 106, together, may axially divide recess 90 into a first pressure chamber 116 in fluid communication with distribution line 206 and control valve 220 (referring to FIG. 3), and a second pressure chamber 118 in fluid communication with distribution line 231 and control valve 224. A seal 120 may be located between an inner annular surface of first piston 104 and an inner projection of housing 14 to seal an inner radial portion of first pressure chamber 116, while a seal 122 may be located between an outer annular surface of second piston 106 and an outer projection of housing 14 to seal an outer radial portion of first pressure chamber 116. Another seal 124 may be located between an inner projection of clutch housing 84 and the outer annular surface of first piston 104 to seal an inner radial portion of second pressure chamber 118. When control valve 220 is moved to the flow-passing position to fill first pressure chamber 116 with pressurized fluid, first piston 104 may be urged to press against an end of clutch pack 86 with a first force resulting in a first torque resisting rotation of sun gear 38 relative to housing 14. The pressurized fluid within first pressure chamber 116 may also simultaneously urge second piston 106 to press against protrusion 112, thereby adding to the pressing force of first piston 104 on clutch pack 86 and resulting in a second and higher resistive torque on sun gear 38. Thus, when first pressure chamber 116 is pressurized, both first and second pistons 104, 106 may be urged to move toward clutch pack 86.

Control valve 224 may be selectively moved to the flow-passing position simultaneous with control valve 220 to fill both clutch 74 and second pressure chamber 118 of clutch 70 with pressurized fluid. When second pressure chamber 118 is filled with pressurized fluid, movement of second piston 106 toward clutch pack 86 may be inhibited (i.e., second piston 106 may be inhibited from pushing on protrusion 112 of first piston 104 and adding to the resistive torque of clutch pack 86). When second pressure chamber 118 is filled with pressurized fluid, second piston 106 may become hydraulically blocked from movement and, in this situation, only first piston 104 may be capable of moving toward and pushing on clutch pack 86 with a lower force. In this manner, different levels of pushing force on clutch pack 86 may be generated by filling first pressure chamber 116 and selectively filling second pressure chamber 118. Accordingly, when shifting to the first reverse gear, control valve 220 may be utilized alone to generate the higher required resistance of about −2.29 times the input torque and, when shifting to the first forward gear, control valves 220 and 224 may be utilized together to reduce the resistive torque of clutch 70 to about 0.31 times the input torque. Because control valve 224 may already be required to activate clutch 74 during the first forward gear ratio, no additional control valves may be required to regulate the force reduction within clutch 70. That is, activation of clutch 74 may automatically reduce the resistive torque of clutch 70. By reducing the resistive torque of clutch 70 to a level just sufficient to lock sun gear 38, the engagement duration of clutch 70 may be extended and the shift quality of transmission assembly 18 may be improved.

Figure 7:
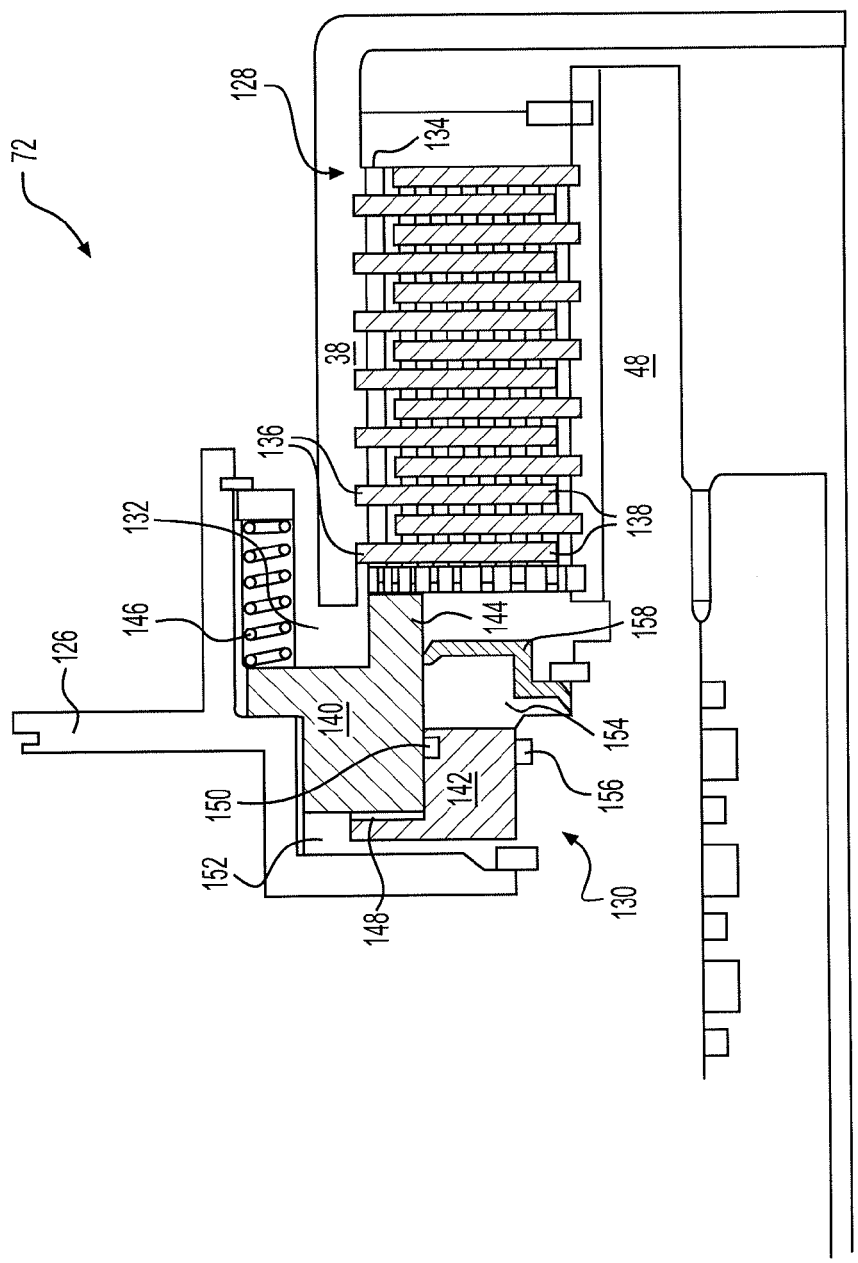
FIG. 7 is a cross-sectional illustration of another portion of the transmission assembly of FIG. 2.

FIG. 7 illustrates an exemplary design of clutch 72 corresponding to the alternative hydraulic circuit of FIG. 4. Clutch 72 may include a clutch housing 126, a clutch pack 128 disposed within clutch housing 126, and a clutch actuator 130 also disposed within clutch housing 126. Clutch actuator 130 may be selectively supplied with pressurized fluid from manifold 204 via control valves 222 and 234 (referring to FIG. 4) to push on clutch pack 128 and thereby engage clutch 72. Clutch housing 126 may be a generally hollow vessel configured to annularly enclose a portion of sun gear 38 and a portion of planet carrier 48 to thereby define an annular recess 132. Sun gear 38 may include an internal spline 134 at recess 132 located in opposition to external teeth of planet carrier 48, with clutch pack 128 disposed therebetween.

Clutch pack 128 may include components engaged with internal spline 134 and with the external gear teeth of planet carrier 48. Specifically, clutch pack 128 may include a first plurality of disks 136, and a second plurality of disks 138 evenly distributed between disks 136. Disks 136 may include an external spline that intermeshes with internal spline 134, while disks 138 may include internal gear teeth that intermesh with the external gear teeth of planet carrier 48. Disks 136 and/or disks 138 may have friction material bonded to their surface and, when clutch pack 128 is pushed on by clutch actuator 130, disks 136 and 138 may be pressed together and become rotationally locked. When disks 136 and 138 are locked, sun gear 38 may be rotationally locked to planet carrier 48.

Clutch actuator 130 may be a hydraulic actuator selectively supplied with pressurized fluid to generate an axial force directed to an end of clutch pack 128. In particular, clutch actuator 130 may include a first piston 140 and a second piston 142 disposed within recess 132 enclosed by clutch housing 126, sun gear 38, and clutch pack 128. Both first and second pistons 140, 142 may be disposed at an end of clutch pack 128, with first piston 140 located radially outward of second piston 142. First piston 140, when viewed in the cross-section of FIG. 7, may include an arm portion 144 that extends radially inward to press on an end of clutch pack 128. A spring 146 may be disposed between an end of first piston 140 and an inner radial surface of clutch housing 126 to bias first piston 140 away from clutch pack 128. A shoulder 148 associated with arm portion 144 may be configured to engage second piston 142 and thereby limit the motion of second piston 142 in the direction of clutch pack 128 (i.e., during motion of second piston 142 toward clutch pack 128, an axial end of second piston 142 may engage and push against shoulder 148). A seal 150 may be disposed between an inner annular surface of first piston 140 and an outer annular surface of second piston 142.

First and second pistons 140, 142, together, may axially divide recess 132 into a first pressure chamber 152 in fluid communication with distribution line 208 and control valve 222 (referring to FIG. 4), and a second pressure chamber 154 in fluid communication with distribution line 232 and control valve 234. A seal 156 may be located at an inner annular surface of second piston 142 to seal an inner radial portion of first pressure chamber 152, while a seal 158 may be located between second pressure chamber 154 and an end of clutch pack 128 to seal a portion of second pressure chamber 154. When control valve 222 (referring to FIG. 4) is moved to the flow-passing position to fill first pressure chamber 152 with pressurized fluid, first piston 140 may be urged to press against clutch pack 128 with a first force resulting in a first torque on sun gear 38 and planet carrier 48 resisting relative rotations. The pressurized fluid within first pressure chamber 152 may also simultaneously urge second piston 142 to press against shoulder 148, thereby adding to the pressing force of first piston 140 on clutch pack 128 resulting in a second and higher resistive torque on sun gear 38 and planet carrier 48. Thus, when first pressure chamber 152 is pressurized, both first and second pistons 140, 142 may be urged to move toward clutch pack 128.

Control valve 234 may be selectively moved to the flow-passing position to fill second pressure chamber 154 of clutch 72 with pressurized fluid. When second pressure chamber 154 is filled with pressurized fluid, movement of second piston 142 toward clutch pack 128 may be inhibited (i.e., second piston 142 may be inhibited from pushing on shoulder 148 of first piston 140 and adding to the resistive torque of clutch pack 128). When second pressure chamber 154 is filled with pressurized fluid, second piston 142 may become hydraulically blocked from movement and, in this situation, only first piston 140 may be capable of moving toward and pushing on clutch pack 128 with a lower force. In this manner, different levels of pushing force on clutch pack 128 may be generated by filling first pressure chamber 152 and selectively filling second pressure chamber 154. Accordingly, when shifting to the first reverse gear, control valve 222 may be utilized alone to generate a resistance of about 1.98 times the input torque required of clutch 72 (referring to FIG. 5) and, when shifting to the first forward gear, control valves 222 and 234 may be utilized together to reduce the resistive torque of clutch 72 to about 0.24 times input torque. By reducing the resistive torque of clutch 72 to a level just required to sufficiently lock sun gear 38 to planet carrier 48, the engagement duration of clutch 72 may be extended and the shift quality of transmission assembly 18 may be improved.

INDUSTRIAL APPLICABILITY

While the transmission assembly of the present disclosure has potential application in any machine requiring multiple speed and torque transmission levels, the disclosed transmission assembly may be particularly applicable to articulated haul trucks, off-highway mining trucks, and other heavy construction machines. Such machines have specific gearing requirements that the disclosed transmission assembly may be capable of meeting. The disclosed transmission assembly may improve the shift quality of any machine by providing varying levels of clutch force actuation. Operation of transmission assembly 18 will now be described.

During operation of machine 10, an operator or an automatic transmission controller may determine the need or desire to shift gears. When shifting to the first reverse gear, based on a signal from the operator or the automatic transmission controller, control valves 220, 222, and 228 may be moved to the flow-passing positions to direct pressurized fluid through distribution lines 206, 208, and 214 to clutches 70, 72, and 78, respectively (referring to FIG. 3). As fluid enters each of these clutches, associated pressure chambers thereof may be filled with the fluid and caused to push against their corresponding clutch packs to rotationally lock the appropriate components. For example, when control valve 220 is opened, first pressure chamber 116 (referring to FIG. 6) of clutch 70 may be filled with pressurized fluid, urging both of first and second pistons 104, 106 to move toward and press on an end of clutch pack 86, thereby pressing disks 98 against disks 100 and rotationally locking sun gear 38 to housing 14 of transmission assembly 18. Similarly, when control valve 222 is opened, clutch 72 may be filled with pressurized fluid, urging the associated clutch pack to rotationally lock sun gear 38 to planet carrier 48. Likewise, when control valve 228 is opened, clutch 78 may be filled with pressurized fluid, urging the associated clutch pack to rotationally lock planet carrier 50 and ring gear 60 to housing 14. In this state, the resistive torque provided by clutches 70, 72, and 78 may be about −2.29, 1.98, and −4.83 times the torque received at input member 20, respectively.

When shifting to the first forward gear, control valves 220, 224, and 228 may be moved to the flow-passing position to direct pressurized fluid through distribution lines 206, 210, 231, and 214 to clutches 70, 74, and 78 (referring to FIG. 3). As fluid enters each of these clutches, associated pressure chambers may be filled with the fluid and caused to push against their corresponding clutch packs to rotationally lock the appropriate components. For example, when control valve 220 is opened, first pressure chamber 116 (referring to FIG. 6) of clutch 70 may be filled with pressurized fluid, urging both first and second pistons 104, 106 to move toward and press on an end of clutch pack 86. However, because control valve 224 may also open at this same time, second pressure chamber 118 of clutch 70 may also be filled with pressurized fluid, thereby inhibiting movement of second piston 106 toward clutch pack 86. As a result, only first piston 104 may actually exert a force on clutch pack 86, pressing disks 98 against disks 100 and rotationally locking sun gear 38 to housing 14 of transmission assembly 18 with a lower resistive torque than exerted during shifting to the first reverse gear. Similarly, when control valve 224 is opened, clutch 74 may be filled with pressurized fluid, causing the associated clutch pack to rotationally lock coupling 64 (i.e., ring gear 54 and sun gear 40) to output member 24. Likewise, when control valve 228 is opened, clutch 78 may be filled with pressurized fluid, causing the associated clutch pack to rotationally lock planet carrier 50 and ring gear 60 to housing 14. In this state, the resistive torque provided by clutches 70, 74, and 78 may be about 0.31, 2.02, and 4.92 times the torque received at input member 20, respectively.

By reducing the resistive torque of clutch 70, when shifting to the first forward gear (as compared to the first reverse gear), the modulation time of clutch 70 (i.e., the time during which clutch 70 is filling with pressurized fluid and before disks 98 and 100 become completely locked) may be increased. This increased modulation time may help to improve a smoothness of the shift.

Operation of clutch 72, of the embodiment of FIGS. 4 and 7, may be similar to that of clutch 70 described above. Accordingly, operation of clutch 72 will not be described in detail in this disclosure. It is contemplated that clutch 70 as depicted in FIG. 6, or clutch 72 as depicted in FIG. 7, may be utilized in transmission assembly 18, but it may be unnecessary that both clutch designs be used together within a single transmission assembly 18. Specifically, either of the clutch designs alone may sufficiently improve shift quality of transmission assembly 18, and the added complexity of including both designs in the same transmission assembly may not be cost effective in some situations.

Numerous advantages may be associated with the disclosed transmission assembly. In particular, because the disclosed clutch designs may utilize existing control valves to provide the varying levels of clutch force actuation, the disclosed transmission system may be relatively simple and easy to control. Further, because first and second pistons 104, 106 or 140, 142 may directly engage and push against each other, fewer components may be required and the number of potential leak paths reduced, thereby improving a durability of transmission assembly 18.

It will be apparent to those skilled in the art that various modifications and variations can be made to the transmission assembly of the present disclosure without departing from the scope of the disclosure. Other embodiments will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A transmission assembly, comprising:
   a clutch pack;
   a first pressure chamber;
   a second pressure chamber;
   a first piston configured to push against the clutch pack when pressurized fluid is directed into the first pressure chamber; and
   a second piston configured to push against the first piston when pressurized fluid is directed into the first pressure chamber and inhibited from pushing against the first piston when pressurized fluid is directed into the second pressure chamber.

2. The transmission assembly of claim 1, further including a spring positioned to resist movement of the first piston toward the clutch pack.

3. The transmission assembly of claim 1, wherein the first piston is disposed radially inward of the second piston.

4. The transmission assembly of claim 3, further including a seal disposed between an outer annular surface of the first piston and an inner annular surface of the second piston.

5. The transmission assembly of claim 1, further including a transmission housing, and a rotating member disposed radially inward of the transmission housing, wherein the clutch pack is configured to lock the rotating member to the transmission housing when pushed on by the first piston.

6. The transmission assembly of claim 5, wherein:
the clutch pack is a first clutch pack;
the rotating member is a first rotating member; and
the transmission assembly further includes:
    a second rotating member;
    a third rotating member; and
    a second clutch pack configured to lock the second rotating member to the third rotating member when actuated.

7. The transmission assembly of claim 6, further including:
a first control valve movable to selectively allow pressurized fluid into the first pressure chamber to move the first and second pistons;
a second control valve movable to selectively allow pressurized fluid into the second pressure chamber to inhibit movement of the second piston; and
a third control valve movable to selectively allow pressurized fluid to actuate the second clutch pack.

8. The transmission assembly of claim 6, further including:
a first control valve movable to selectively allow pressurized fluid into the first pressure chamber to actuate the first clutch pack; and
a second control valve movable to selectively allow pressurized fluid to actuate the second clutch pack and to allow pressurized fluid into the second pressure chamber.

9. The transmission assembly of claim 8, wherein:
the first rotating member is a sun gear;
the second rotating member is a first planet carrier; and
the third rotating member is a second planet carrier.

10. The transmission assembly of claim 9, further including a third clutch pack configured to lock the first planet carrier to the sun gear when actuated.

11. The transmission assembly of claim 1, wherein the first piston includes an arm projecting radially inward to contact an end of the clutch pack.

12. The transmission assembly of claim 1, wherein:
pressurized fluid is directed into only the first pressure chamber during operation in a reverse travel direction; and
pressurized fluid is directed into the first and second pressure chambers during operation in a forward travel direction.

13. The transmission assembly of claim 12, wherein when only the first pressure chamber is filled with pressurized fluid, the clutch pack exerts a force at least six times greater then when both the first and second pressure chambers are filled with pressurized fluid.

14. A method of operating a transmission, comprising:
pressurizing a first chamber to generate a first resistive torque on a rotating member during a transmission operation in a first direction; and
pressurizing the first chamber and a second chamber to generate a second resistive torque less than the first resistive torque during a transmission operation in a second direction,
wherein a second piston is inhibited from pushing against a first piston when pressurized fluid is directed into the second pressure chamber.

15. The method of claim 14, wherein pressurizing the first chamber locks the rotating member to a transmission housing.

16. The method of claim 14, further including actuating a clutch pack to lock a second rotating to a third rotating member, wherein actuation of the clutch pack initiates pressurizing of the second chamber.

17. The method of claim 14, wherein:
only the first chamber is pressurized during operation in a reverse travel direction; and
the first and second chambers are pressurized during operation in a forward travel direction.

18. The method of claim 17, wherein pressurizing only the first chamber results in at least six times more resistive torque than pressurizing both the first and second chambers.

19. A transmission assembly, comprising:
a housing;
a sun gear;
a first planet carrier;
a second planet carrier;
a first clutch pack configured to selectively lock the sun gear to the housing;
a second clutch pack configured to selectively lock the first planet carrier to the second planet carrier;
a first pressure chamber;
a second pressure chamber;
a first piston configured to push against the first clutch pack with a first force when pressurized fluid is directed into the first pressure chamber during operation of the transmission in a forward gear ratio;
a spring positioned to resist movement of the first piston toward the clutch pack; and
a second piston configured to push against the first piston with a second force when pressurized fluid is directed into the first pressure chamber during operation of the transmission in the forward gear ratio, and inhibited from pushing against the first piston when pressurized fluid is directed into the second pressure chamber during operation in a reverse gear ratio,
wherein activation of the second clutch pack initiates pressurizing of the second chamber.

* * * * *